United States Patent
Soisnard

[19]

[11] Patent Number: 5,961,089
[45] Date of Patent: Oct. 5, 1999

[54] SLIDE FOR AUTOMOBILE VEHICLE SEATS

[75] Inventor: Michel Soisnard, La Selle La Forge, France

[73] Assignee: Bertrand Faure Equipements S.A, Boulogne Cedex, France

[21] Appl. No.: 09/055,328

[22] Filed: Apr. 6, 1998

[30] Foreign Application Priority Data

Apr. 15, 1997 [FR] France .................................. 97 04795

[51] Int. Cl.⁶ .................................................. F16M 11/20
[52] U.S. Cl. ..................... 248/430; 296/65.14; 296/68.1; 384/47
[58] Field of Search ..................... 248/430, 429, 248/424, 419, 420; 384/34, 47; 296/65.13, 65.14, 68.1

[56] References Cited

U.S. PATENT DOCUMENTS

| | | | |
|---|---|---|---|
| 3,759,587 | 9/1973 | Christin | 384/47 |
| 4,232,895 | 11/1980 | Yoshio et al. | 296/68.1 |
| 4,422,612 | 12/1983 | Frank | 248/430 |
| 4,530,481 | 7/1985 | Klüting et al. | 248/394 |
| 4,711,589 | 12/1987 | Goodbred | 384/34 |
| 4,776,551 | 10/1988 | Nishino | 248/429 |
| 4,957,267 | 9/1990 | Terai | 248/430 |
| 5,213,300 | 5/1993 | Rees | 248/429 |
| 5,370,350 | 12/1994 | Okano et al. | 248/430 |
| 5,454,541 | 10/1995 | Ito | 248/430 |
| 5,529,397 | 6/1996 | Yoshida | 384/47 |

FOREIGN PATENT DOCUMENTS

| | | |
|---|---|---|
| 0 697 306 | 2/1996 | European Pat. Off. . |
| 2728203 | 6/1996 | France . |
| 43 04 107 | 9/1993 | Germany . |
| 43 01 241 | 7/1994 | Germany . |

*Primary Examiner*—Ramon O. Ramirez
*Assistant Examiner*—Anita M. King
*Attorney, Agent, or Firm*—Pollock, Vande Sande & Amernick

[57] ABSTRACT

A slide for vehicle seats includes a generally U-shaped female section having two flanges respectively extending to flange returns that confront one another. Also included is a generally U-shaped male section also having two flanges respectively extending to flange returns that are oppositely directed from one another, the flange returns of the male section are inserted under the flange returns of the female section. At least one retention unit is attached to the female section and extends between the flanges of the male section. Pointed teeth extend from edges of the retention unit and are directed toward confronting adjacent planar surfaces of the male section flanges. Tips of the teeth are made of a material harder than that of the male section to allow penetration of the teeth into the planar surfaces of the male section flanges thereby anchoring the teeth therein, in response to deformed displacement of the male section flanges toward the teeth.

6 Claims, 2 Drawing Sheets

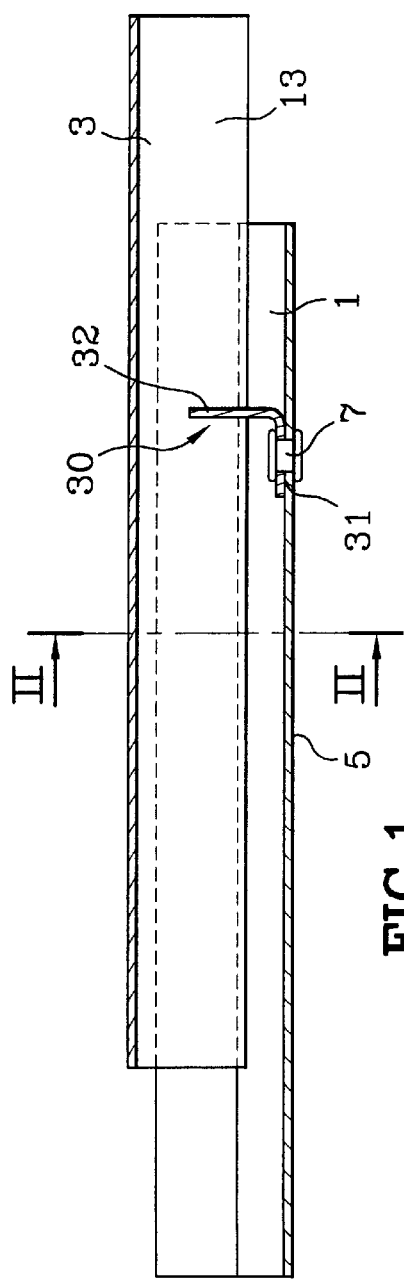
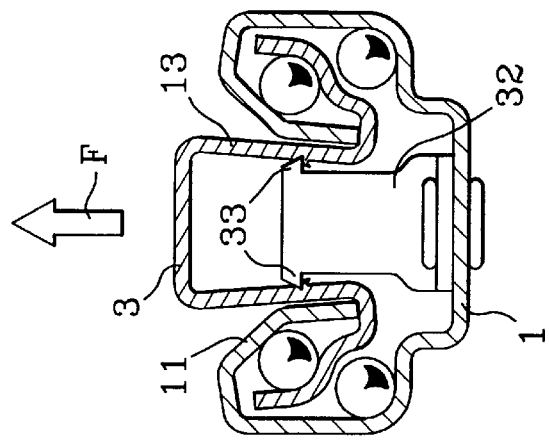
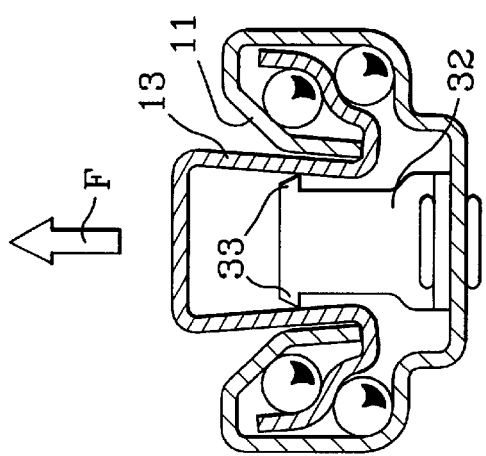
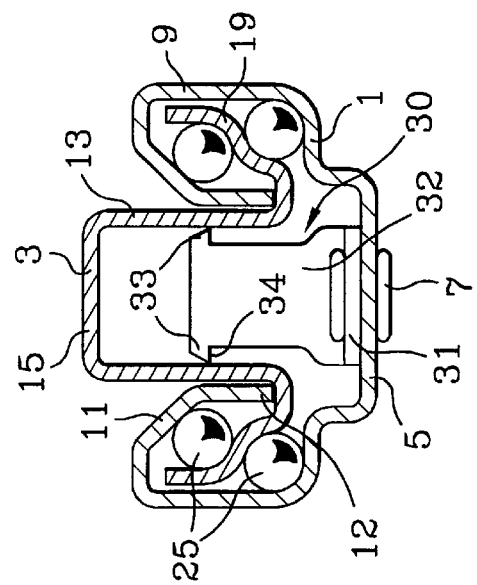

SLIDE FOR AUTOMOBILE VEHICLE SEATS

FIELD OF THE INVENTION

This invention concerns a slide for automobile vehicle seats, especially for the front seats. These seats are installed on slides to adjust the longitudinal position, especially the driver's seat, enabling him to adjust the position of his seat to suit his size.

BACKGROUND OF THE INVENTION

Apart from the adjustment function, the slides attach the seat to the floor of the vehicle and therefore must be sufficiently strong to prevent the seat separating from the floor especially in the case of a collision.

Several types of slides are already well known. Generally speaking, slide systems consist of a female element and a male element, one being attached to the floor and the other to the structure of the seat. Also, they include operating components and locking components. Adjustment of position is normally done manually but can also be motorized.

Known slides are thus constituted by the assembly of two sections sliding one inside the other, this sliding movement being facilitated for instance by using ball bearings placed between the two sections. In particular, slide systems are known where the female section is U-shaped and where the flanges include a return towards the inside, the male section also being generally U-shaped, open on the female section side over its complete length and including flanges which are inserted under the flange returns of the female section.

Therefore, the sections require complex shapes to stop them from coming apart when subjected to a tearing force applied to the seat. Indeed, under such a vertical force, the flanges of the female section have a tendency to move apart and those of the male section to move towards each other hence the risk of the male section coming out of the female section and the seat detaching from the vehicle.

To avoid the flanges of the male section from moving towards each other, it is already known, for example by document FR-A-2250400, to reinforce this section by spacers placed between the flanges of the male section and spaced over the length of the section.

We also know, by document FR-A-2728203, of a slide where the female section includes at least one spacing element which is inserted between the sides constituting the flanges of the male section U to prevent them from moving towards each other. On this slide, the spacing element, which is also used to attach the female section to the floor of the vehicle, is fixed, whereas the male section, attached to the frame of the seat, can slide. The flanges of the male section fit around the spacing element irrespective of the slide adjustment position and therefore cannot move towards each other.

BRIEF DESCRIPTION OF THE INVENTION

The aim of this invention is to improve still further a system of this type to provide increased safety by reinforcing the attachment of the seat to the floor of the vehicle when, in the case of an accident, a high vertical upwards load tends to separate the two sections of the slide.

With these targets in mind, the subject of the invention is a slide for vehicle seats, consisting of a female section generally U-shaped with two flanges and two flange returns oriented towards each other and towards the bottom of the U. A male section is also generally U-shaped with flanges and flange returns oriented towards the outside and inserted under the flange returns of the female section. This slide includes at least one retention part attached to the female section and extends between the flanges of the male section, the retention part including on each side, opposite the flanges of the male section, at least one pointed tooth, made of a material harder than that of the male section, the tip of the tooth is located in the direct vicinity of the flange of the male section.

In normal operation, minimum clearance exists between the tip of each tooth and the wall of the flange opposite it thus enabling normal sliding of the male section in relation to the female section. In case of a high load tending to move the two sections away from each other, and on account of the nesting of the flange returns of the male section under the flange returns of the female section, distortion of the sections occurs which tends to move the two flanges of the male section towards each other as will be better understood later. When this distortion is accentuated, the flanges of the male section come into contact with the tips of the teeth of the retention part and, because the metal of which they are made is harder than that of the said section, start to bite into the metal of the flanges and anchor themselves there with increasing force if distortion continues. The flanges of the male section are in a way harpooned by the teeth of the retention part and as this part is attached to the female section, the separation started by the two sections cannot continue. It is to be noted that the anchoring of the teeth in the flanges is of course deeper as the flanges move towards each other. But, in addition, this anchoring is accentuated, when the two slides continue to move away from each other by the fact that the teeth then produce a burr by starting to tear the metal of the flanges and this burr creates an additional obstacle preventing the slides from moving apart. In other words, the higher the force tending to separate the two slides, the greater the resistance to this force.

To facilitate this effect still further, according to a preferential arrangement, the edges of the teeth which are located toward a female section bottom are more or less parallel to the bottom or even inclined towards it.

Other characteristics and advantages of the invention will be given in the description which follows of a slide in compliance with the invention.

Refer to the appended drawings on which:

BRIEF DESCRIPTION OF THE DRAWINGS

FIG. 1 is a longitudinal sectional view of a first design of slide,

FIG. 2 is an enlarged scale sectional view along line II—II of FIG. 1,

FIGS. 3 and 4 illustrate the evolution of the distortions of the two sections under a load tending to separate the two sections.

DETAILED DESCRIPTION

Figure 5:
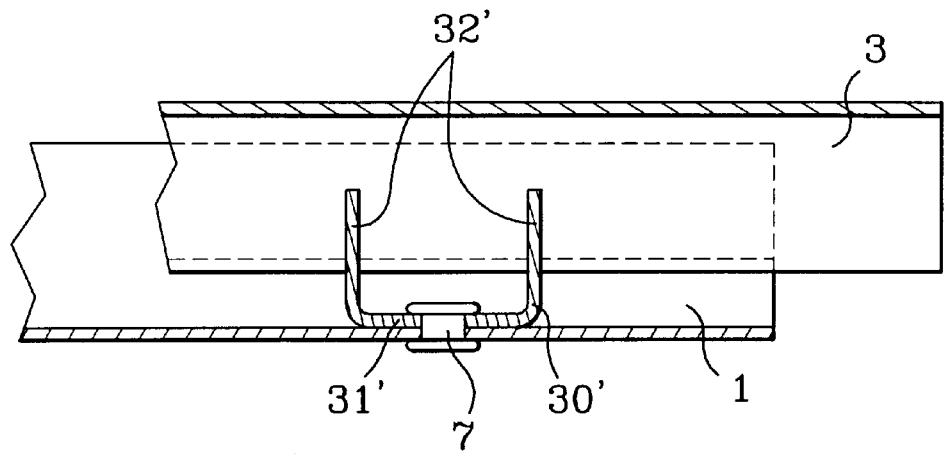
FIG. 5 is a partial longitudinal sectional view of a first design variant of the slide, FIGS. 6 and 7 respectively show a longitudinal and transverse sectional view of a second design variant.

The slide systems shown on the various figures consists of a female section 1 and a male section 3 made of sheet steel hot rolled and shaped by bending, for example steel with a high elastic limit.

Female section 1 is generally U-shaped, including a bottom 5 more or less flat, intended to be positioned horizontally and attached to the floor (not shown) of the vehicle, and two side flanges 9 extending more or less vertically and prolonged by hook-shaped flange returns 11 oriented towards the inside of the U and downwards.

Male profile 3 is also generally U-shaped with two flanges 13 extending parallel and vertically downwards from a bottom wall 15 intended to be attached to a seat frame, not shown. The flange returns 19 extend from the lower edges of flanges 13, towards the outside and upwards, and are inserted under flange returns 11 of female section 1 passing just below edge 12 of this section.

The respective flanges and flange returns of the two sections are shaped to constitute raceways for the balls 25 spaced along the slide, and known manner, to facilitate the movement of the male section in the female section.

A retention part 30, generally square-shaped, is placed inside the slide, towards the rear end of the female section (located towards the right on FIG. 1). This retention part is made from a material harder than the metal of the sections 1 and 3, for example steel subjected to a quench and temper heat and thermochemical treatment. A flange 31 of the retention part extends to against bottom 5 of the female section and is attached by a rivet 7. Attachment could also be made by a screw or by welding or any other equivalent attaching means. The other flange 32 of the retention part extends vertically, in a plane perpendicular to the sliding direction of the slide, between the two flanges 13 of the male section. Flange 32 is cut so as to form, on each side, a pointed tooth 33 extending in the direction of flange 13 of the male section opposite it, the tip of the tooth remaining however at a distance from the wall of the flange of the male section, around 0.5 mm for example.

In normal slide operating position, as shown on FIG. 2, the retention part in no way disturbs the relative sliding of the sections due to the clearance which exists between the teeth and the flanges of the male section.

When the male section is subjected to a high upward force, which can be produced by the forces exerted on the seat during an accident, the sections have a tendency to distort as shown on FIGS. 3 and 4. Initially, as shown on FIG. 3, the vertical force F tends to move the male section upwards. Due to the fact that the flange returns 19 of the male section are nested under those 11 of the female section, this force tends to unbend the flange returns. The result, as can be easily understood, is that the lower portions of flanges 13 of the male section move towards each other until they come into contact with teeth 33 of the retention part. As this movement continues, as shown on FIG. 4, teeth 33 bite into the softer metal of flanges 13 and are anchored there thus blocking the upward movement of the male section. As was already explained, the anchoring of the teeth will be stronger as force F increases as the movement of flanges 13 towards each other will then have a tendency to accentuate. This effect is accentuated by the fact that flanges 13, which were initially more or less parallel, are then inclined and that the distance between their lower edges is lower than the corresponding distance at the level of the teeth, thus facilitating the anchoring of the teeth if the male section moves upward. This effect is again accentuated by the burrs, which can be seen on FIG. 4, which form if the male section moves upward after the teeth have bitten into the flanges. To ensure correct anchoring of the teeth in the metal of the flanges, lower faces 34 of the teeth are more or less perpendicular to the flanges. This prevents the tendency of the force raising the male section to extract the teeth from the indent that they have made by bitting into the flanges of the male section.

It is to be noted again that teeth 33 are located more or less at the height of flange returns 11 of the female section, that is sufficiently above the lower edge of the flanges of the male section but sufficiently low however to be in the area where the distortion of the flanges is the highest.

In the design variant shown on FIG. 5, retention part 30' is U-shaped with two flanges 32' which extend in a plane perpendicular to the sliding direction of the slide, each flange being equipped with the teeth 33. The retention part is then attached to bottom 5 of the female section by riveting portion 31' connecting the two flanges 32'. This variant allows, due to the presence of four teeth in all, the tearing resistance of the male section to be reinforced.

Figure 6:
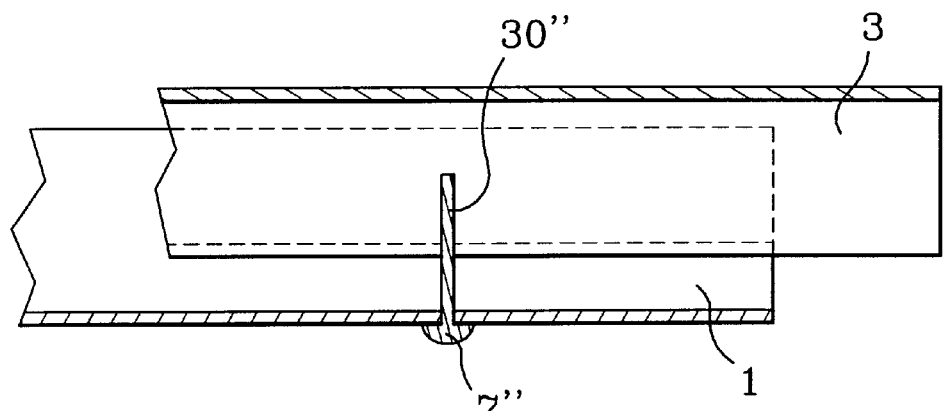
Figure 7:
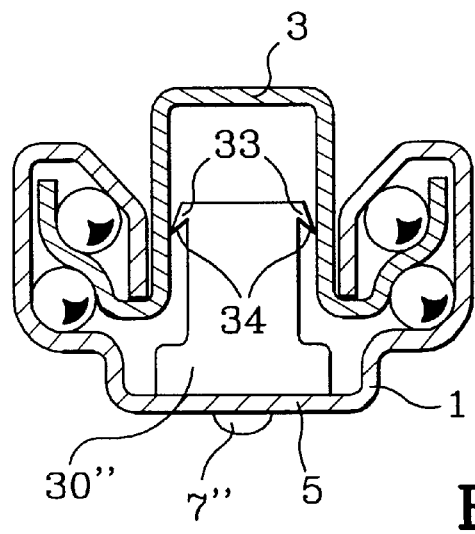

In the second variant, shown on FIGS. 6 and 7, retention part 30" consists of a flat plate attached to the bottom of the female section by crimping 7" of a tab extending from the edge of the said plate, into a hole made in the said bottom. In this variant, anchoring is improved still further by inclining the lower faces of the teeth towards the bottom towards the outside as can be seen on FIG. 7, thus facilitating continued penetration of the teeth into the flanges when these tend to move upwards. The latter arrangement is of course also applicable to other designs of the retention part.

The invention is not limited to the designs described above only as an example. In particular, several of the said retention parts could also be used on a given slide.

The invention can also be applied to slides made of light alloys, for example aluminum alloy.

I claim:

1. Slide for vehicle seats, comprising: a female section generally U-shaped with two flanges and two flange returns oriented towards each other, and a male section also generally U-shaped with flanges and flange returns oriented towards the outside and inserted under flange returns of the female section, at least one retention part attached to the female section and extending between the flanges of the male section, the retention part including, on each side, opposite the flanges of the male section, at least one pointed tooth, made of a material harder than that of the male section, the tip of the tooth being located in the direct vicinity of the flange of the male section;

edges of the teeth located on a bottom side of the female section are generally parallel to the bottom or inclined towards it.

2. Slide for vehicle seats, comprising: a female section generally U-shaped with two flanges and two flange returns oriented towards each other, and a male section also generally U-shaped with flanges and flange returns oriented towards the outside and inserted under flange returns of the female section, at least one retention part attached to the female section and extending between the flanges of the male section, the retention part including, on each side, opposite the flanges of the male section, at least one pointed tooth, made of a material harder than that of the male section, the tip of the tooth being located in the direct vicinity of the flange of the male section;

the teeth located at the same level as flange returns of the female section.

3. Slide for vehicle seats, comprising: a female section generally U-shaped with two flanges and two flange returns oriented towards each other, and a male section also generally U-shaped with flanges and flange returns oriented towards the outside and inserted under flange returns of the female section, at least one retention part attached to the female section and extending between the flanges of the male section, the retention part including, on each side, opposite the flanges of the male section, at least one pointed tooth, made of a material harder than that of the male section, the tip of the tooth being located in the direct vicinity of the flange of the male section;

the retention part being square-shaped with a first flange that extends in a plane perpendicular to the sliding direction of the slide, another flange extending against the bottom of the female section and being attached to the bottom.

4. Slide for vehicle seats, comprising: a female section generally U-shaped with two flanges and two flange returns oriented towards each other, and a male section also generally U-shaped with flanges and flange returns oriented towards the outside and inserted under flange returns of the female section, at least one retention part attached to the female section and extending between the flanges of the male section, the retention part including, on each side, opposite the flanges of the male section, at least one pointed tooth, made of a material harder than that of the male section, the tip of the tooth being located in the direct vicinity of the flange of the male section;

the retention part being U-shaped with two flanges extending in a plane perpendicular to the sliding direction of the slide, each flange being equipped with the teeth.

5. Slide for vehicle seats, comprising: a female section generally U-shaped with two flanges and two flange returns oriented towards each other, and a male section also generally U-shaped with flanges and flange returns oriented towards the outside and inserted under flange returns of the female section, at least one retention part attached to the female section and extending between the flanges of the male section, the retention part including, on each side, opposite the flanges of the male section, at least one pointed tooth, made of a material harder than that of the male section, the tip of the tooth being located in the direct vicinity of the flange of the male section;

the retention part including a flat plate attached to the bottom of the female section by crimping of a tab extending from an edge of the plate and extending into a hole made in the bottom.

6. A slide for vehicle seats comprising:

a generally U-shaped female section having two flanges respectively extending to flange returns that confront one another;

a generally U-shaped male section also having two flanges respectively extending to flange returns that are oppositely directed from one another, the flange returns of the male section inserted under the flange returns of the female section;

at least one retention unit attached to the female section and extending between the flanges of the male section;

pointed teeth extending from edges of the retention unit and directed toward confronting adjacent planar surfaces of the male section flanges;

tips of the teeth made of a material harder than that of the male section to allow penetration of the teeth into the planar surfaces of the male section flanges thereby anchoring the teeth therein, in response to deformed displacement of the male section flanges toward the teeth.

* * * * *